UNITED STATES PATENT OFFICE.

FRANCIS A. HALSEY, OF SAN RAFAEL, CALIFORNIA.

SMOKELESS POWDER.

SPECIFICATION forming part of Letters Patent No. 570,705, dated November 3, 1896.

Application filed April 16, 1896. Serial No. 587,846. (No specimens.)

*To all whom it may concern:*

Be it known that I, FRANCIS A. HALSEY, a citizen of the United States, residing at San Rafael, county of Marin, State of California, have invented an Improvement in the Manufacture of Smokeless Gunpowder; and I hereby declare the following to be a full, clear, and exact description of the same.

My invention relates to improvements in the manufacture of explosive compounds, and especially to that class of compounds known as "smokeless gunpowder."

It consists in a composition of ingredients which will be more fully explained by reference to the following specification.

In the manufacture of my improved powder I employ ammonium picrate, potassium bichromate, and potassium permanganate. These are mixed in approximately the following proportions: ammonium picrate, sixty-eight per cent.; potassium bichromate, twenty-five per cent.; potassium permanganate, seven per cent.; but these proportions may be varied somewhat for different uses, as, for example, if used in a shotgun the proportions here given are very effective. When used in rifles, the proportion of ammonium picrate would be increased and the other ingredients diminished.

In preparing my powder I first grind or pulverize the ammonium picrate into a fine powder, then dissolve the potassium permanganate in boiling water, and also dissolve the potassium bichromate separately in boiling water. The ammonium picrate and potassium bichromate, if desired, may be first mixed and the potassium permanganate subsequently added. I have found that if the boiling solution of potassium permanganate be added to the ammonium picrate a considerable effervescence and sudden precipitate takes place, showing that there is a reaction between these two substances, but if mixed when cold no such reaction is apparent. The effect is the same in whatever order the mixture be made. If mixed as previously described, the ammonium picrate and bichromate of potassium are first mixed, so as to form a pasty compound. The potassium permanganate dissolved in boiling water is then added slowly and mixed in, so as to prevent too rapid an effervescence in the compound. After being thoroughly mixed the compound is dried at a low temperature, approximately about 120° Fahrenheit, and is afterward granulated in any suitable or well-known manner, so as to give the powder the proper form for use in small-arms of any description. I have found that the addition of potassium permanganate facilitates the granulation, and when the grains are formed they are much harder and less liable to explode with sudden violence, thereby producing an undue breech-pressure in the gun, the effect being practically to reduce the initial or breech pressure.

Powder made in this manner gives a whiter and less apparent vapor and less apparent noxious fumes than other so-called "smokeless" compounds.

Having thus described my invention, what I claim as new, and desire to secure by Letters Patent, is—

A compound consisting of an ammonium picrate, potassium bichromate and potassium permanganate substantially as described.

In witness whereof I have hereunto set my hand.

FRANCIS A. HALSEY.

Witnesses:
 H. H. DOWNING,
 THOS. L. ARCHER.